(12) United States Patent
Bodin et al.

(10) Patent No.: US 7,912,803 B2
(45) Date of Patent: Mar. 22, 2011

(54) CREATING A SESSION LOG WITH A TABLE OF RECORDS FOR A COMPUTING DEVICE BEING STUDIED FOR USABILITY BY A PLURALITY OF USABILITY EXPERTS

(75) Inventors: William K. Bodin, Austin, TX (US); Ann M. Maynard, Austin, TX (US); Derral C. Thorson, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 738 days.

(21) Appl. No.: 11/769,379

(22) Filed: Jun. 27, 2007

(65) Prior Publication Data

US 2009/0006983 A1    Jan. 1, 2009

(51) Int. Cl.
*G06F 17/00* (2006.01)
(52) U.S. Cl. ......................................................... 706/47
(58) Field of Classification Search .................... 706/59, 706/45–48; 702/120; 715/723; 386/69
See application file for complete search history.

(56) References Cited

U.S. PATENT DOCUMENTS

| | | | |
|---|---|---|---|
| 5,086,393 A | 2/1992 | Kerr et al. | |
| 5,999,908 A | 12/1999 | Abelow | |
| 6,741,967 B1 | 5/2004 | Wu et al. | |
| 7,133,834 B1 | 11/2006 | Abelow | |
| 7,415,510 B1 * | 8/2008 | Kramerich et al. | 709/219 |
| 7,822,702 B2 * | 10/2010 | Bodin et al. | 706/62 |
| 2002/0012520 A1 * | 1/2002 | Nagasaka et al. | 386/46 |
| 2005/0254775 A1 * | 11/2005 | Hamilton et al. | 386/46 |
| 2006/0184980 A1 * | 8/2006 | Cole | 725/88 |
| 2006/0279628 A1 * | 12/2006 | Fleming | 348/143 |
| 2007/0160551 A1 | 5/2007 | McGucken | |
| 2009/0006108 A1 * | 1/2009 | Bodin et al. | 705/1 |
| 2009/0006306 A1 * | 1/2009 | Bodin et al. | 706/59 |
| 2009/0006966 A1 * | 1/2009 | Bodin et al. | 715/723 |
| 2009/0006983 A1 | 1/2009 | Bodin et al. | |

OTHER PUBLICATIONS

Kushniruk et al., Cognitive and usability engineering methods for the evaluation of clinical information systems, Sep. 2003, Elsevier Inc., pp. 62-73.*

Wilcox, et al., Annotation and Segmantation for Multimedia Indexing and Retrieval, 1998, IEEE Computer Society, 8 pages.*

(Continued)

*Primary Examiner* — David R Vincent
(74) *Attorney, Agent, or Firm* — Edward J. Lenart; Justin Dillon; Biggers & Ohanian, LLP

(57) ABSTRACT

Methods, systems, and products are disclosed for creating a session log for a computing device being studied for usability by a plurality of usability experts that include: displaying, by a usability engine to a plurality of usability experts, a usability observation video of a user interacting with a computing device during a usability session for studying the usability of the device; detecting, by an event listener on the computing device, an event generated as a result of user interaction with the device; notifying, by the event listener, the usability engine of the event; recording, by the usability engine, a description of the event in a session log; receiving, by the usability engine from at least one of the usability experts, usability observations regarding the usability of the device; and recording, by the usability engine, the usability observations in the session log.

18 Claims, 7 Drawing Sheets

OTHER PUBLICATIONS

Jokela, et al.; Methods for Quantitative Usability Requirements: A Case Study on the Development of the User Interface of a Mobile Phone; Oct. 2005; pp. 345-355; Springer-Verlag London Limited 2005.

Kangas, et al.; Applying User-Centered Design to Mobile Application Development; Communications of the ACM; Jul. 2005; pp. 55-59; vol. 48, No. 7; ACM.

Kjeldskov, et al.; Instant Data Analysis: Conducting Usability Evaluations in a Day; NordiCHI '04; Oct. 2004; pp. 344-351; ACM 1-58113-857-1/04/10; Tampere, Finland.

Rosenbaum, et al.; Usability in Practice: User Experience Lifecycle—Evolution and Revolution; CHI 2002; Apr. 2002; pp. 898-903; ACM 1-58113-454-1/02/0004; Minneapolis, Minnesota, USA.

Spertus, Evaluating Similarity Measures: A Large-Scale Study in the Orkut Social Network, Aug. 2005, ACM, pp. 1-7.

Kushnirk et al., Conitive and usability engineering methods for the evaluation of clinical information systems, Sep. 2003, Elsevier inc., pp. 62-73.

Final Office Action, U.S. Appl. No. 11/769,235, USPTO Mail Date Jun. 7, 2010.

Office Action, U.S. Appl. No. 11/769,235, USPTO Mail Date Feb. 24, 2010.

Final Office Action, U.S. Appl. No. 11/769,391, USPTO Mail Date Sep. 14, 2010.

Office Action, U.S. Appl. No. 11/769,391, USPTO Mail Date Feb. 25, 2010.

Final Office Action, U.S. Appl. No. 11/769,379, USPTO Mail Date Jun. 3, 2010.

Notice of Allowance, U.S. Appl. No. 11/769,379, USPTO Mail Date Nov. 17, 2010.

Office Action, U.S. Appl. No. 11/769,379, USPTO Mail Date Feb. 24, 2010.

Notice of Allowance, U.S. Appl. No. 11/769,365, USPTO Mail Date Jun. 16, 2010.

Office Action, U.S. Appl. No. 11/769,365, USPTO Mail Date Feb. 25, 2010.

* cited by examiner

US 7,912,803 B2

CREATING A SESSION LOG WITH A TABLE OF RECORDS FOR A COMPUTING DEVICE BEING STUDIED FOR USABILITY BY A PLURALITY OF USABILITY EXPERTS

BACKGROUND OF THE INVENTION

1. Field of the Invention

The field of the invention is data processing, or, more specifically, methods, systems, and products for creating a session log for a computing device being studied for usability by a plurality of usability experts.

2. Description of Related Art

When computer architects design a computing device and its software, these architects often make a great effort to ensure that the device is convenient and easy to use from the perspective of a user. For example, the buttons on the device should be easily accessible when needed for device interaction, while not hindering the user's interaction with the device when the buttons are not in use. As a further example, the graphical user interface of a device should be logically arranged and configured from the user's perspective such that the user's interaction with the device is intuitive for the user.

To ensure that a computing device is convenient and easy to use from a user's perspective, computer architects typically perform usability studies on the interaction of a user with the computing device. Usability refers to a full range of aspects that impact a user's success and satisfaction when interacting with the device. Usability encompass issues such as, for example, a user's understanding of how to operate the device's interface, the ease with which a user is able to physically manipulate the device and its controls, a user's emotions while interacting with the device, the correspondence between the user's desired output from the device and the output actually produced by the device, and so on. In studying a device's usability, high usability is generally regarded as a desirable feature of the device.

Usability studies have traditionally been conducted by having a usability expert observe a user interacting with a computing device and record the expert's observations in a log. The drawback to this traditional approach to studying usability is that the information recorded in the log is limited to the observations capable of being observed by a usability expert. As devices have become smaller and more complex, the ability of a usability expert to observe importance aspects affecting the user's interaction with a computing device is greatly diminished. In particular, some aspects of the user's interaction may not be observable at all. As such, readers will appreciate that room for improvement exists in the area of studying the usability of a computing device.

SUMMARY OF THE INVENTION

Methods, systems, and products are disclosed for creating a session log for a computing device being studied for usability by a plurality of usability experts that include: displaying, by a usability engine to a plurality of usability experts, a usability observation video of a user interacting with a computing device during a usability session for studying the usability of the device; detecting, by an event listener on the computing device, an event generated as a result of user interaction with the device; notifying, by the event listener, the usability engine of the event; recording, by the usability engine, a description of the event in a session log; receiving, by the usability engine from at least one of the usability experts, usability observations regarding the usability of the device; and recording, by the usability engine, the usability observations in the session log.

The foregoing and other features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
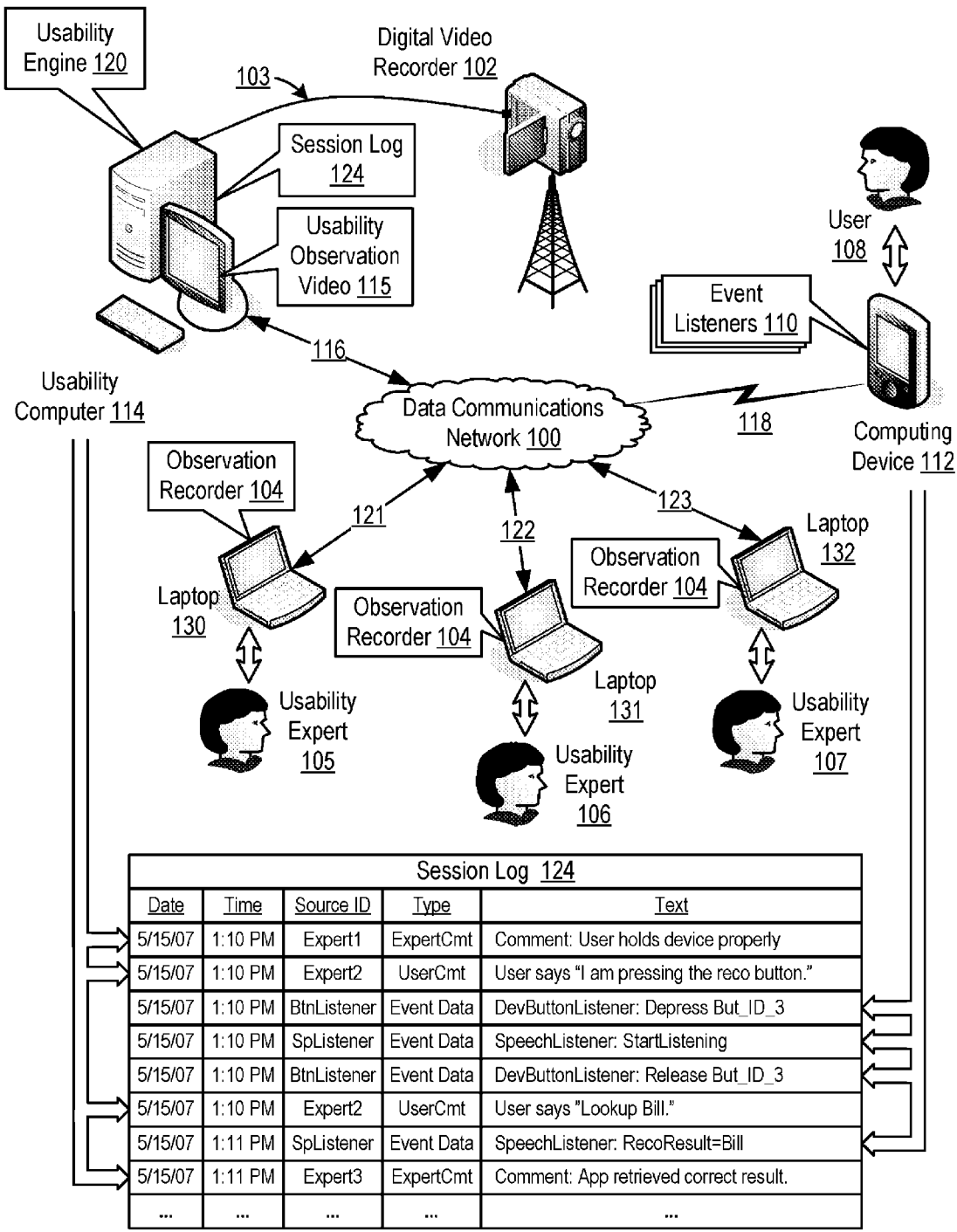
FIG. 1 sets forth a network diagram of a system for creating a session log for a computing device being studied for usability by a plurality of usability experts according to embodiments of the present invention.

Exemplary methods, systems, and products for creating a session log for a computing device being studied for usability by a plurality of usability experts in accordance with the present invention are described with reference to the accompanying drawings, beginning with FIG. 1. FIG. 1 sets forth a network diagram of a system for creating a session log (124) for a computing device (112) being studied for usability by a plurality of usability experts (105, 106, 107) according to embodiments of the present invention. The exemplary system of FIG. 1 operates generally for creating a session log (124) for a computing device (112) being studied for usability by a plurality of usability experts (105, 106, 107) according to embodiments of the present invention as follows: A usability engine (120) displays, to a plurality of usability experts (105, 106, 107), a usability observation video (115) of a user (108) interacting with a computing device (112) during a usability session for studying the usability of the device (112). An event listener (110) on the computing device (112) detects an event generated as a result of user interaction with the device (112) and notifies the usability engine (120) of the event. The usability engine (120) then records a description of the event in the session log (124). The usability engine (120) also receives, from at least one of the usability experts (106), usability observations regarding the usability of the device (112) and records the usability observations in the session log (124).

The exemplary system of FIG. 1 includes a computing device (112) connected to a data communications network (100) through wireless connection (118). The computing device (112) of FIG. 1 is being studied for usability by a plurality of usability experts (105, 106, 107). Each usability expert (105, 106, 107) is a person who specializes in the study of how people interact with and use computing devices. Each usability expert may possess general knowledge regarding the field of usability or may specialize in certain aspects of usability. For example, a usability expert may specialize as a cognitive psychologist, user interface specialist, an application expert, a language specialist, and so on.

In the exemplary system of FIG. 1, readers will note that the computing device (112) is implemented as a personal digital assistant ('PDA'). Readers will note, however, that such an implementation is for example only and not for limitation. In fact, the computing device (112) may be implemented as any general-purpose or special-purpose computing device as will occur to those of skill in the art. Examples of computing devices may include desktop computers, laptop computers, cell phones, gaming consoles, PDAs, personal video recorders, and any other computing device as will occur to those of skill in the art.

In the example of FIG. 1, each usability expert (105, 106, 107) observes the user (108) interacting with the computing device (112) from a usability observation video (115) provided by the usability engine (120). The usability engine (120) captures the usability observation video (115) using a digital video recorder (102). The digital video recorder (102) of FIG. 1 is a portable electronic device for capturing video images and audio and recording video images and audio onto a storage medium. The storage medium may include, for example, flash memory, video tape, or any other storage medium as will occur to those of skill in the art. The digital video recorder (102) typically transmits and stores the usability observation video (115) using an encoder/decoder ('codec') such as, for example, Cinepak, Motion JPEG, MPEG, and so on. In the example of FIG. 1, the digital video recorder (102) transmits the usability observation video (115) for storage on the usability computer (114) through the data communications cable (103). The data communications cable (103) may be implemented as a Universal Serial Bus cable, Serial Digital Interface cable, FireWire cable, High-Definition Multimedia Interface Cable, or any other data communications cable as will occur to those of skill in the art.

In the example of FIG. 1, the usability observation video (115) recorded by the digital video recorder (102) is a digital video. A digital video is a collection of digital frames typically used to create the illusion of a moving picture. Each frame of digital video includes image data for rendering one still image and metadata associated with the image data. The metadata of each frame may include synchronization data for synchronizing the frame with an audio stream, configurational data for devices displaying the frame, closed captioning data, and so on. Each frame is typically displayed by a display device that flashes each frame on a display screen for a brief period of time, typically ¹⁄₂₄th, ¹⁄₂₅th or ¹⁄₃₀th of a second, and then immediately replaces the frame displayed on the display screen with the next frame of the digital video. As a person views the display screen, persistence of vision in the human eye blends the displayed frames together to produce the illusion of a moving image.

In the exemplary system of FIG. 1, each usability expert (105, 106, 107) views the usability observation video (115) using a laptop (130, 131, 132). The usability expert (105) views the video (115) on the display screen of laptop (130) connected to the network (100) through a wireline connection (121). The usability expert (106) views the video (115) on the display screen of laptop (131) connected to the network (100) through a wireline connection (122). The usability expert (107) views the video (115) on the display screen of laptop (132) connected to the network (100) through a wireline connection (123). Each laptop (130, 131, 132) of FIG. 1 may receive and display the usability observation video (115) from the usability engine (120) using a media player such as, for example, the Windows Media Player, QuickTime, RealPlayer, Winamp, and so on.

Each laptop (130, 131, 132) in the exemplary system of FIG. 1 has installed upon it an observation recorder (104). The observation recorder (104) of FIG. 1 is a software component that supports creating a session log for a computing device being studied for usability by a plurality of usability experts according to embodiments of the present invention. The observation recorder (104) of FIG. 1 supports creating a session log for a computing device being studied for usability by a plurality of usability experts according to embodiments of the present invention by accepting as input observation data from the usability experts (105, 106, 107) and providing the observation data to a usability engine (120) for storage in the session log (124) on the usability computer (114). Using the observation recorder (104), each usability expert (105, 106, 107) of FIG. 1 records usability observations in a session log (124) that the usability expert observed during a usability session for studying the interaction of a user (108) with the computing device (112). A usability session is a period of time dedicated by a user to interact with a particular computing device being studied for usability.

In the example of FIG. 1, the observation recorder (104) may provide the observation data to a usability engine (120) using data communications architectures such as, for example, web services, CORBA, Java™ Remote Method Invocation API, and so on. 'CORBA' refers to the Common Object Request Broker Architecture, a computer industry specifications for interoperable enterprise applications produced by the Object Management Group ('OMG'). CORBA is a standard for remote procedure invocation first published by the OMG in 1991. CORBA can be considered a kind of object-oriented way of making remote procedure calls, although CORBA supports features that do not exist in conventional RPC. CORBA uses a declarative language, the Interface Definition Language ("IDL"), to describe an object's interface. Interface descriptions in IDL are compiled to generate 'stubs' for the client side and 'skeletons' on the server side. Using this generated code, remote method invocations effected in object-oriented programming languages, such as C++ or Java, look like invocations of local member methods in local objects.

The Java™ Remote Method Invocation API is a Java application programming interface for performing remote procedural calls published by Sun Microsystems™. The Java™ RMI API is an object-oriented way of making remote procedure calls between Java objects existing in separate Java™ Virtual Machines that typically run on separate computers. The Java™ RMI API uses a remote procedure object interface to describe remote objects that reside on the server. Remote procedure object interfaces are published in an RMI registry where Java clients can obtain a reference to the remote interface of a remote Java object. Using compiled 'stubs' for the client side and 'skeletons' on the server side to provide the network connection operations, the Java™ RMI allows a Java client to access a remote Java object just like any other local Java object.

In the exemplary system of FIG. 1, the computing device (112) has installed upon it several event listeners (110). An event listener is a software component that detects the occurrence of an event that was generated as a result of user interaction with the device (112). The event listeners (110) of FIG. 1 may be able to detect the occurrence of events such as, for example, when a user depresses or releases a button on the device (112), when the user selects components on the device's graphical user interface, when software on the device processes a user's request or provides the user with output, and so on. An event listener may be implemented as interrupt handler, instrumentation code having instrumentation hooks embedded in other software components, a subroutine called by another software module, or any other implementation as will occur to those of skill in the art. In the example of FIG. 1, each event listener (110) operates for creating a session log for a computing device being studied for usability by a plurality of usability experts according to embodiments of the present invention. Each event listener (110) of FIG. 1 operates for creating a session log for a computing device being studied for usability by a plurality of usability experts according to embodiments of the present invention by detecting an event generated as a result of user interaction with the device and notifying the usability engine (120) of the event. In the example of FIG. 1, each event listener (110) may notify the usability engine (120) of the event using data communications architectures such as, for example, web services, CORBA, Java™ Remote Method Invocation API, and so on.

As mentioned above, the exemplary system of FIG. 1 also includes a usability computer (114) connected to the data communications network (100) through wireline connection (116). The usability computer (114) of FIG. 1 has installed upon it a usability engine (120). The usability engine (120) is a software component that receives event notifications from one or more event listeners (110) and that administers the session log (124) and the usability observation video (115). The usability engine (120) of FIG. 1 includes computer program instructions configured for creating a session log for a computing device being studied for usability by a plurality of usability experts according embodiments of the present invention. The usability engine (120) of FIG. 1 operates generally for creating a session log for a computing device being studied for usability by a plurality of usability experts according embodiments of the present invention by: displaying, to a plurality of usability experts (105, 106, 107), a usability observation video (115) of a user (108) interacting with a computing device (112) during a usability session for studying the usability of the device (112); recording, in the session log (124), a description of an event detected by an event listener (110) and generated as a result of user interaction with the device (112); receiving, from at least one of the usability experts (105, 106, 107), usability observations regarding the usability of the device (112); and recording the usability observations in the session log (124).

The session log (124) of FIG. 1 is a data structure that stores information provided by a usability expert that describes an interaction of a user with a computing device during a usability session and information provided by one or more event listeners that is generate as a result of the user interaction with the device. A session log may be implemented as a table of a database, text file, or any other implementation as will occur to those of skill in the art. In the example of FIG. 1, the session log (124) is implemented as a table. Each record of the table represents observation data provided by the usability expert (106) or an event detected by one of the event listeners (110) on the computing device (112). Each record includes a 'Date' field that indicates the date on which the information in record was generated. Each record includes a 'Time' field that indicates the time at which the information in the record was generated. Each record includes a 'Source ID' field that specifies the source of the information stored in the record. For example, a value of 'Expert1' for the 'Source ID' field specifies that the information is a usability observation entered by a usability expert identified as 'Expert1.' A value of 'BtnListener' for the 'Source ID' field specifies that the information is an event description detected by an event listener identified as 'BtnListener.' Each record also includes a 'Type' field that specifies whether the record contains event data or specifies the type of usability observation entered by a usability expert. For example, a value of 'Event Data' for the 'Type' field indicates that the record represents an event detected by one of the event listeners (110). Any other value indicates that the record represents an observation by one of the usability experts (105, 106, 107) and specifies an identifier indicating the type of usability observation the record contains. For example, a value of 'ExpertCmt' for the 'Type' field indicates that the record represents a comment authored by the usability expert. A value of 'UserCmt' for the 'Type' field indicates that the record represents a comment authored by the user (108) and recorded by the usability expert. Each record also includes a 'Text' field that provides details of the usability observation recorded by the usability expert (105, 106, 107) or the event description provided by an event listener (110).

In the exemplary system of FIG. 1, the usability experts (105, 106, 107) may view the usability observation video (115) in real-time during the usability session, or the usability experts may view the usability observation video (115) after the usability session is concluded. When the usability experts (105, 106, 107) view the usability observation video (115) after the usability session is concluded, the usability observations provided by the usability experts will not typically bear timestamps that permit the usability engine to insert the observations in the session log (124) in the proper time sequence with respect to the event description data in the session log, which is typically recorded in near real-time as the events are detected by the event listeners (110). As such, the usability engine (120) may also operate for creating a session log for a computing device being studied for usability by a plurality of usability experts according to embodiments of the present invention by: identifying the portion of the usability observation video (115) displayed to the usability expert when the usability expert observed the usability observations using timecodes embedded in the usability observation video (115); identifying the portion of the session log (124) that corresponds to the identified portion of the usability observation video (115); and inserting the usability observations in the identified portion of the session log (124).

As mentioned above, the usability experts (105, 106, 107) of FIG. 1 may specialize in certain aspects of usability. For example, one usability expert may specialize as a cognitive psychologist, another as a user interface specialist, another as an application expert, still another as a language specialist, and so on. Because each usability expert (105, 106, 107) have a particular role in studying the usability of the device (112), the usability engine (120) of FIG. 1 may also operate for creating a session log for a computing device being studied for usability by a plurality of usability experts according to embodiments of the present invention by filtering the usability observations in dependence upon the particular role of each usability expert (106).

In the exemplary system of FIG. 1, some usability experts (105, 106, 107) may find event descriptions useful in aiding the experts ability to assess the usability of the device (112). The usability engine (120) of FIG. 1 therefore may also operate for creating a session log for a computing device being studied for usability by a plurality of usability experts according to embodiments of the present invention by providing, to the plurality of usability experts (105, 106, 107), a description of an event detected by one of the event listeners. In providing event descriptions to the plurality of usability experts (105, 106, 107), the usability engine (120) may identify the portion of the usability observation video recorded when the event was detected using timecodes embedded in the usability observation video (115), and embed the description of the event in the identified portion of the usability observation video (115). Because each usability expert (105, 106, 107) have a particular role in studying the usability of the device (112), the usability engine (120) provide event descriptions to the plurality of usability experts (105, 106, 107) by filtering the description of the event to be provided to each usability expert in dependence upon the particular role of each usability expert (105, 106, 107).

The arrangement of servers and other devices making up the exemplary system illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example Transmission Control Protocol ('TCP'), Internet Protocol ('IP'), HyperText Transfer Protocol ('HTTP'), Wireless Access Protocol ('WAP'), Handheld Device Transport Protocol ('HDTP'), and others as will occur to those of skill in the art. Various embodiments of the present invention may be implemented on a variety of hardware platforms in addition to those illustrated in FIG. 1.

Creating a session log for a computing device being studied for usability by a plurality of usability experts in accordance with the present invention may be implemented with one or more computing devices, that is automated computing machinery. For further explanation, therefore, FIG. 2 sets forth a block diagram of automated computing machinery comprising an exemplary computing device (112) useful in creating a session log for a computing device being studied for usability by a plurality of usability experts according to embodiments of the present invention. The computing device (112) of FIG. 2 includes at least one computer processor (156) or 'CPU' as well as random access memory (168) ('RAM') which is connected through a high speed memory bus (166) and bus adapter (158) to processor (156) and to other components of the computing device.

Figure 2:
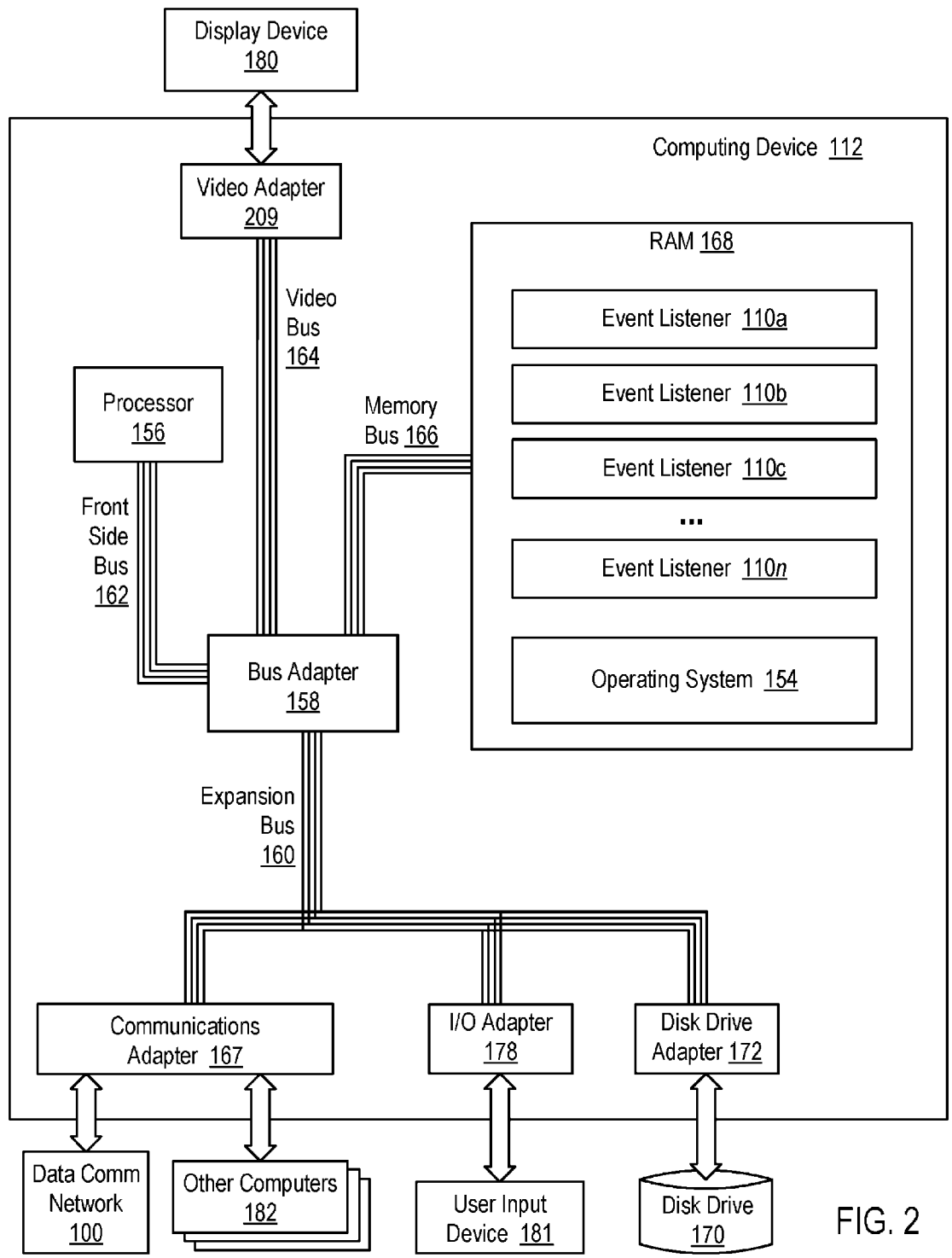
FIG. 2 sets forth a block diagram of automated computing machinery comprising an exemplary computing device useful in creating a session log for a computing device being studied for usability by a plurality of usability experts according to embodiments of the present invention.

Stored in RAM (168) are several event listeners (110). An event listener is a software component that detects the occurrence of an event that was generated as a result of user interaction with the device (112). The event listeners (110) of FIG. 2 may be able to detect the occurrence of events such as, for example, when a user depresses or releases a button on the device (112), when the user selects components on the device's graphical user interface, when software on the device processes a user's request or provides the user with output, and so on. An event listener may be implemented as interrupt handler, instrumentation code having instrumentation hooks embedded in other software components, a subroutine called by another software module, or any other implementation as will occur to those of skill in the art. In the example of FIG. 2, each event listener (110) operates for creating a session log for a computing device being studied for usability by a plurality of usability experts according to embodiments of the present invention. Each event listener (110) of FIG. 2 operates for creating a session log for a computing device being studied for usability by a plurality of usability experts according to embodiments of the present invention by detecting an event generated as a result of user interaction with the device and notifying a usability engine on a usability computer of the event.

Also stored in RAM (168) is an operating system (154). Operating systems useful in computing devices according to embodiments of the present invention include UNIX™, Linux™, Microsoft NT™, IBM's AIX™, IBM's i5/OS™, and others as will occur to those of skill in the art. The operating system (154) and the event listeners (110) in the example of FIG. 2 are shown in RAM (168), but many components of such software typically are stored in non-volatile memory also, for example, on a disk drive (170).

The exemplary computing device (112) of FIG. 2 includes bus adapter (158), a computer hardware component that contains drive electronics for high speed buses, the front side bus (162), the video bus (164), and the memory bus (166), as well as drive electronics for the slower expansion bus (160). Examples of bus adapters useful in computing devices useful according to embodiments of the present invention include the Intel Northbridge, the Intel Memory Controller Hub, the Intel Southbridge, and the Intel I/O Controller Hub. Examples of expansion buses useful in computing devices useful according to embodiments of the present invention may include Peripheral Component Interconnect ('PCI') buses and PCI Express ('PCIe') buses.

The exemplary computing device (112) of FIG. 2 also includes disk drive adapter (172) coupled through expansion bus (160) and bus adapter (158) to processor (156) and other components of the exemplary computing device (112). Disk drive adapter (172) connects non-volatile data storage to the exemplary computing device (112) in the form of disk drive (170). Disk drive adapters useful in computing devices include Integrated Drive Electronics ('IDE') adapters, Small Computer System Interface ('SCSI') adapters, and others as will occur to those of skill in the art. In addition, non-volatile computer memory may be implemented for a computing device as an optical disk drive, electrically erasable programmable read-only memory (so-called 'EEPROM' or 'Flash' memory), RAM drives, and so on, as will occur to those of skill in the art.

The exemplary computing device (112) of FIG. 2 includes one or more input/output ('I/O') adapters (178). I/O adapters in computing devices implement user-oriented input/output through, for example, software drivers and computer hardware for controlling output to display devices such as computer display screens, as well as user input from user input devices (181) such as keyboards and mice. The exemplary computing device (112) of FIG. 2 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary computing device (112) of FIG. 2 includes a communications adapter (167) for data communications with other computers (182) and for data communications with a high speed, low latency data communications network (100). Such data communications may be carried out through Ethernet™ connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful for creating a session log for a computing device being studied for usability by a plurality of usability experts according to embodiments of the present invention include modems for wired dial-up communications, IEEE 802.3 Ethernet adapters for wired data communications network communications, and IEEE 802.11b adapters for wireless data communications network communications.

Although FIG. 2 is discussed with reference to exemplary computing devices having installed upon them event listeners, readers will note that automated computing machinery used to implement exemplary usability computers having installed upon them usability engines useful in creating a usability observation video for a computing device being studied for usability according to embodiments of the present invention are similar to the exemplary computing device (112) of FIG. 2. That is, such exemplary usability computers having installed upon them usability engines include one or more processors, bus adapters, buses, RAM, video adapters, communications adapters, I/O adapters, disk drive adapters, and other components similar to the exemplary computing device (112) of FIG. 2 as will occur to those of skill in the art.

Figure 3:
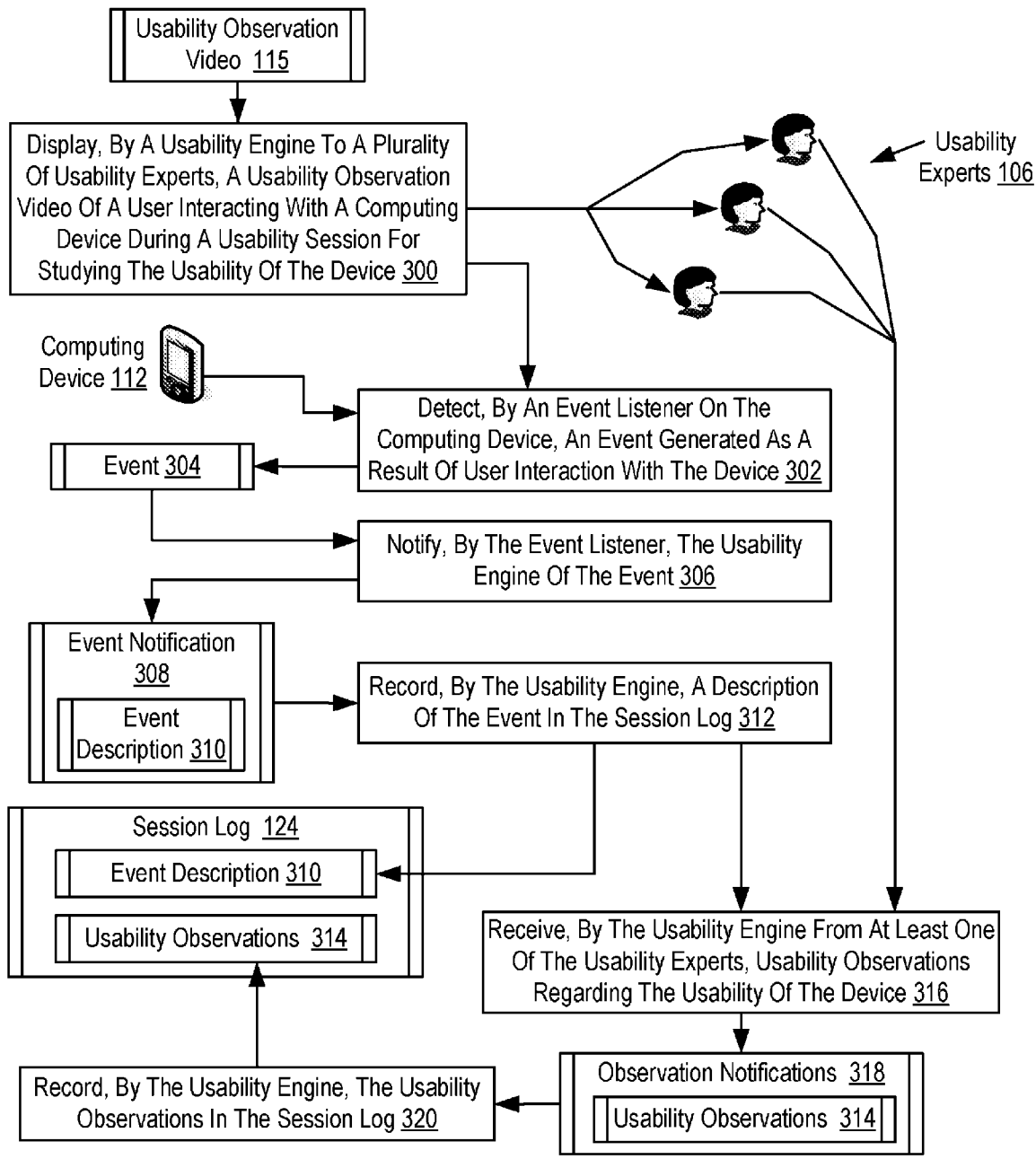
FIG. 3 sets forth a flow chart illustrating an exemplary method of creating a session log for a computing device being studied for usability by a plurality of usability experts according to embodiments of the present invention.

For further explanation, FIG. 3 sets forth a flow chart illustrating an exemplary method of creating a session log for a computing device being studied for usability by a plurality of usability experts according to embodiments of the present invention. The method of FIG. 3 includes displaying (300), by a usability engine to a plurality of usability experts (106), a usability observation video (115) of a user interacting with a computing device (112) during a usability session for studying the usability of the device (112). The usability engine may display (300) a usability observation video (115) to a plurality of usability experts (106) according to the method of FIG. 3 by receiving the usability observation video (115) from a digital video recorder, receiving an indication to transmit the video (115) from each of the plurality of experts (106), and streaming the usability observation video (115) to media players operated by the plurality of usability experts (106). A digital video recorder may provide the usability observation video (115) of a user interacting with a computing device (112) by converting analogue audio and video signals received from the recorder's audio/visual input components into digital audio and video signals and storing the digital audio and video signals as frames (316) using one or more codecs as will occur to those of skill in the art. As mentioned above, the usability engine may display (300) a usability observation video (115) to a plurality of usability experts (106) according to the method of FIG. 3 in real-time during the usability session or after the usability session has completed.

The method of FIG. 3 also includes detecting (302), by an event listener on the computing device (112), an event (304) generated as a result of user interaction with the device (112). An event (304) of FIG. 3 represents any event generated as a result of user interaction with the device (112). Examples of events may include when a user depresses or releases a button on the device (112), when the user selects components on the device's graphical user interface, when software on the device processes a user's request or provides the user with output, and any other event as will occur those of skill in the art. An event listener is a software component that detects the occurrence of an event that was generated as a result of user interaction with the device (112). An event listener may be implemented as interrupt handler, instrumentation code having instrumentation hooks embedded in other software components, a subroutine called by another software module, or any other implementation as will occur to those of skill in the art.

Because some event listeners may only be concerned with a single event and are only executed when the event occurs, such an event listener may detect (302) an event (304) according to the method of FIG. 3 by receiving processing control of the computing device's processor upon the occurrence of the event. Processing control may be transferred to an event listener using an interrupt or through a function call directed by another software module. In other embodiments, an event listener may detect (302) an event (304) according to the method of FIG. 3 by polling hardware registers or software variables to identify whether a particular event has occurred.

The method of FIG. 3 also includes notifying (306), by the event listener, the usability engine of the event (304). A usability engine is a software component that receives event notifications from one or more event listeners and that administers the session log (124) and the usability observation video (115). The event listener may notify (306) a usability engine of the event (304) according to the method of FIG. 3 by encapsulating a description (310) of the event in an event notification message (308) and transmitting the event notification message (308) to the usability engine. The event listener may transmit the event notification message (308) to the usability engine using any message passing mechanism as will occur to those of skill in the art, including web services, a CORBA framework, and Java RMI. The event notification message (308) of FIG. 3 represents a data structure for providing a usability engine with information regarding an event that occurred on the computing device (112) in response to a user's interaction with the device (112). The description (310) of the event in an event notification message (308) may include the following exemplary information:

Date, which specifies the date on which the event was detected;
Time, which specifies the time at which the event was detected;
Priority, which specifies the level of importance of the event;
Listener Identifier, which specifies the particular listener on the computing device that detected the event; and
Event Description, which provides event specific details concerning the event.

The method of FIG. 3 includes recording (312), by the usability engine, a description (310) of the event (304) in the session log (124). The session log (124) of FIG. 3 represents a data structure that stores information provided by a usability expert that describes an interaction of a user with a computing device during a usability session and information provided by one or more event listeners that is generate as a result of the user interaction with the device. A session log may be implemented as a table of a database, text file, or any other implementation as will occur to those of skill in the art. The usability engine may record (312) a description (310) of the event (304) in the session log (124) according to the method of FIG. 3 by receiving the event notification message (308) provided by the event listener, extracting the description (310) of the event (304) from the event notification message (308), and storing the event description (310) in the session log (124).

The method of FIG. 3 also includes receiving (316), by the usability engine from at least one of the usability experts (106), usability observations (314) regarding the usability of the device (112). A usability observation is a description of any aspect of the user's interaction with the device that the usability expert (106) deems relevant to the usability study. For example, usability observations may describe the user's emotional state as the user operates the device (112), the speech spoken by the user to the device (112), the synthesized speech provided by the device (112) to the user, a description of how well the user appears to be operating the device, and any other aspect of the user's interaction that the usability expert (106) deems relevant to the usability study. The usability engine may receive (316) usability observations (314) from at least one of the usability experts (106) according to the method of FIG. 3 by receiving a observation notification message (318) from observation recorder software installed on the usability expert's computer. The usability expert (106) providing the usability observations (314) may enter the observations (314) into observation recorder software installed on the usability expert's computer as the usability expert views the usability observation video (115). As the observation recorder software receives usability observations (314) from a usability expert (106), the observation recorder software may timestamp the usability observations (314), encapsulate the usability observations in the observation notification message (318), and transmit the observation notification message (318) to the usability engine through a data communications connection. The data communications connection may be implemented using web service, a CORBA framework, Java RMI, or any other implementation as will occur to those of skill in the art.

The method of FIG. 3 includes recording (320), by the usability engine, the usability observations (314) in the session log (124). The usability engine may record (320) the usability observations (314) in the session log (124) according to the method of FIG. 3 by unencapsulating the usability observations (314) from the observation notification message (318) and storing the usability observations (314) in the session log (124). The usability engine may store the usability observations (314) in the session log (124) as the usability observations (314) are received from the observation recorder software used by the usability experts (106) to enter the observation (314).

As mentioned above, usability experts may view the usability observation video in real-time during the usability session, or they may view the usability observation video after the usability session is concluded. When the usability experts view the usability observation video after the usability session is concluded, the usability observations provided by the usability experts will not typically bear timestamps that permit the usability engine to insert the observations in the session log in the proper time sequence with respect to the event description data in the session log, which is typically recorded in near real-time as the events are detected by the event listeners. Upon receiving the usability observations from a usability expert when the expert views the usability observation video after the usability session is concluded, the usability engine may have to identify the portion of the session log that corresponds to the time in the usability video at which the usability expert entered the usability observation in order that the usability engine may insert the observation into the session log in the proper time sequence with respect to the event description data already stored in the session log. For further explanation, therefore, consider FIG. 4 that sets forth a flow chart illustrating a further exemplary method of creating a session log for a computing device being studied for usability by a plurality of usability experts according to embodiments of the present invention.

Figure 4:
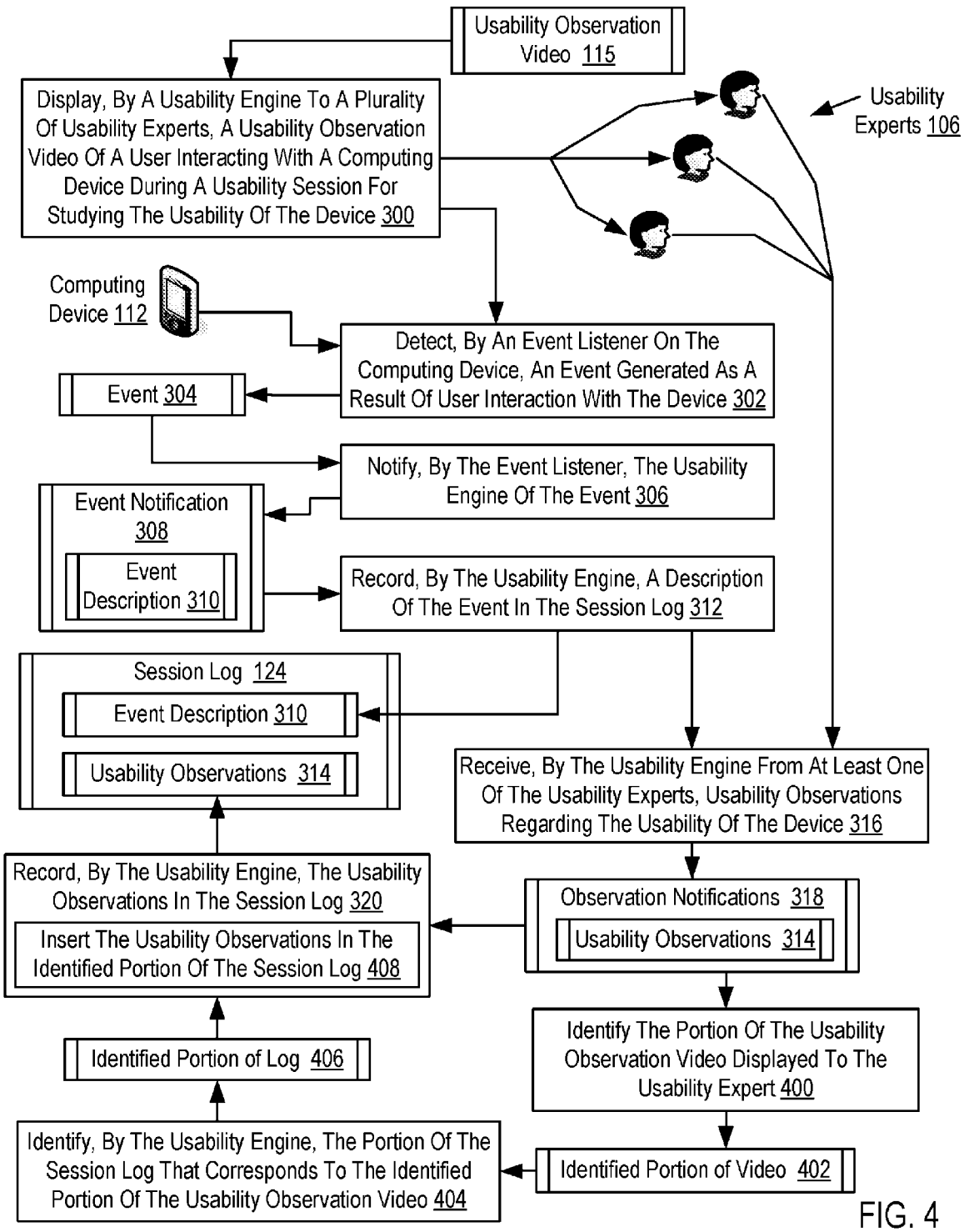
FIG. 4 sets forth a flow chart illustrating a further exemplary method of creating a session log for a computing device being studied for usability by a plurality of usability experts according to embodiments of the present invention.

The method of FIG. 4 is similar to the method of FIG. 3. That is, the method of FIG. 4 includes: displaying (300), by a usability engine to a plurality of usability experts (106), a usability observation video (115) of a user interacting with a computing device (112) during a usability session for studying the usability of the device (112); detecting (302), by an event listener on the computing device (112), an event (304) generated as a result of user interaction with the device (112); notifying (306), by the event listener, the usability engine of the event (304) using an event notification message (308); recording (312), by the usability engine, a description (310) of the event (304) in a session log (124); receiving (316), by the usability engine from at least one of the usability experts (106), usability observations (314) regarding the usability of the device (112) in an observation notification message (318); and recording (320), by the usability engine, the usability observations (314) in the session log (124).

The method of FIG. 4 also includes identifying (400) the portion (402) of the usability observation video (115) displayed to the usability expert (106) when the usability expert (106) observed the usability observations (314) using timecodes embedded in the usability observation video (115). The timecodes embedded in the usability observation video (115) are signals typically encoded in each frame of the usability observation video (115) to identify each frame and to provide the frame's relative location in the video timeline. The timecodes embedded in the usability observation video (115) may be implemented as Society of Motion Picture and Television Engineers ('SMPTE') timecodes, MIDI timecodes, Rewriteable Consumer timecodes, and any other timecodes as will occur to those of skill in the art.

As mentioned above, the usability observations (314) are typically timestamped as the observations are entered by the usability expert (106). The usability engine may therefore identify (400) the portion (402) of the usability observation video (115) displayed to the usability expert (106) when the usability expert (106) observed the usability observations (314) according to the method of FIG. 4 by tracking the times at which the frames of the usability observation video (115) are displayed to the usability expert (106) and identifying the frames of the usability observation video (115) displayed at a time that matches the timestamp of the usability observations (314). In the example of FIG. 4, the frames of the usability observation video (115) displayed at a time that matches the timestamp of the usability observations (314) represent the portion (402) of the usability observation video (115) displayed to the usability expert (106) when the usability expert (106) observed the usability observations (314). When matching the time at which the frames of the video (115) are displayed to the timestamp of the usability observations (314), the usability engine may take into account any timing skews that result when two different clocks are used. For example, one clock may be used to track the times at which the frames are displayed by the usability engine, while another clock may be used to embed the time in the usability observations (314). To correct any such timing skews, the usability engine may calculate the skew between the two clocks and factor in the calculated timing skew when matching the time at which the frames of the video (115) are displayed to the timestamp of the usability observations (314). Readers will note, however, that timing skews can be avoided if the same clock is used to match the time at which the frames of the video (115) are displayed to the timestamp of the usability observations (314). Such a clock will typically be implemented in the computer used by the usability expert (106) to view the usability observation video. In such an embodiment, the computer used by the usability expert (106) may embed the identified frames of the video (112) in the observation notification message (318) sent to the usability engine so that the usability engine is able to identify (400) the portion of the video (115) displayed to the expert (106) when the observation was entered.

The method of FIG. 4 also includes identifying (404), by the usability engine, the portion (406) of the session log (124) that corresponds to the identified portion (402) of the usability observation video (115). The usability engine may identify (404) the portion (406) of the session log (124) that corresponds to the identified portion (402) of the usability observation video (115) according to the method of FIG. 4 by retrieving timecodes from the frames that make up the identified portion (402) of the video (115) and selecting a location in the session log (124) having event descriptions (310) with timestamps that match the timecodes of the frames that make up the identified portion (402) of the video (115). In the example of FIG. 4, the selected location in the session log (124) represents the identified portion (406) of the session log (124) that corresponds to the identified portion (402) of the usability observation video (115).

As mentioned above, the method of FIG. 4 includes recording (320), by the usability engine, the usability observations (314) in the session log (124). Recording (320), by the usability engine, the usability observations (314) in the session log (124) according to the method of FIG. 4 includes inserting (408) the usability observations (314) in the identified portion (406) of the session log (124).

Usability experts may specialize in certain aspects of usability. For example, one usability expert may specialize as a cognitive psychologist, another as a user interface specialist, another as an application expert, still another as a language specialist, and so on. Based on their specialties, each usability expert may have a particular role in studying the usability of a particular computing device. When each usability expert has a particular role in studying the usability of a device, the usability engine may only record usability observation from a particular expert when the type of observation matches the role of the particular expert. For further explanation, therefore, FIG. 5 sets forth a flow chart illustrating a further exemplary method of creating a session log for a computing device being studied for usability by a plurality of usability experts according to embodiments of the present invention in which each usability expert (106) has a particular role in studying the usability of the device (112).

Figure 5:
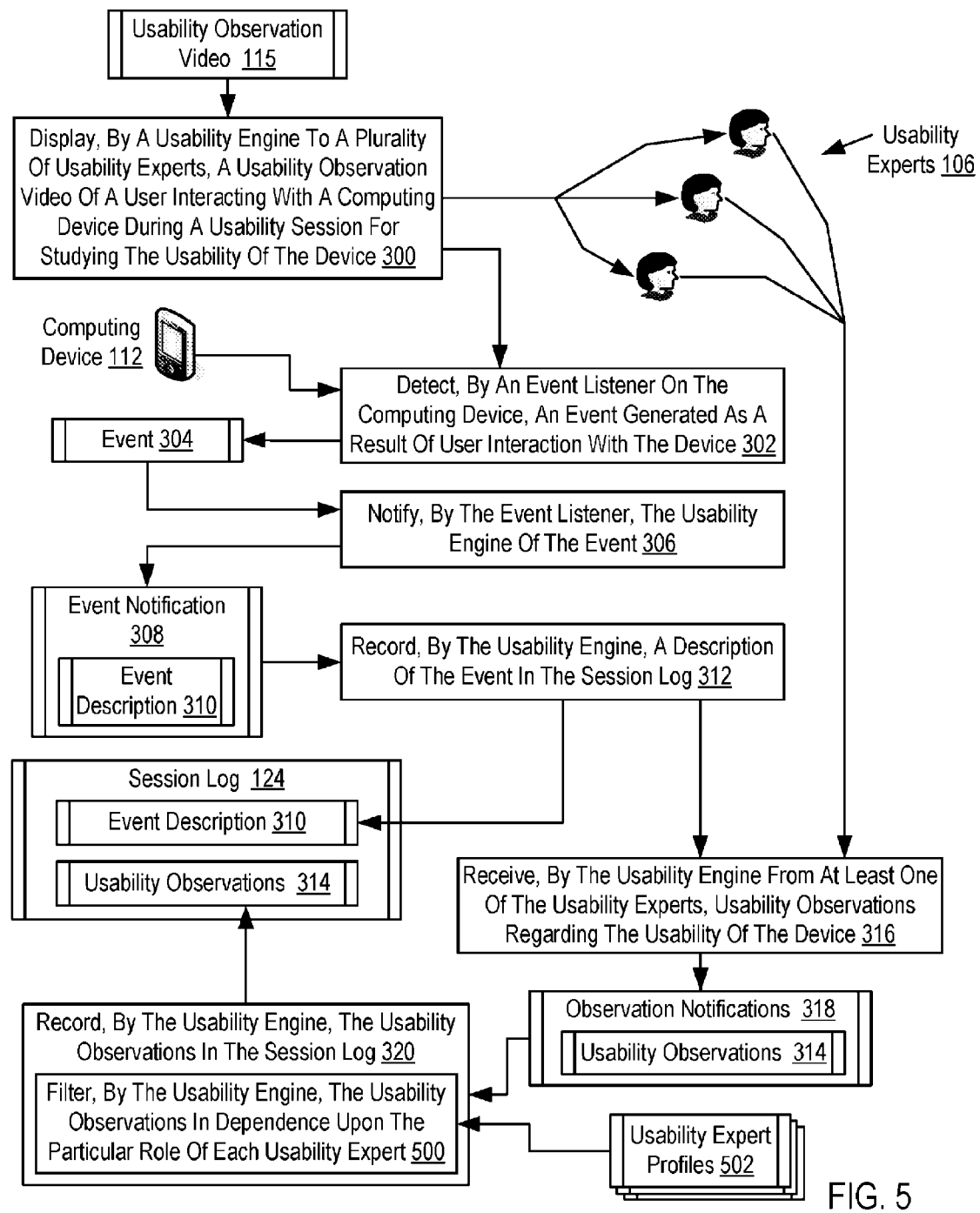
FIG. 5 sets forth a flow chart illustrating a further exemplary method of creating a session log for a computing device being studied for usability by a plurality of usability experts according to embodiments of the present invention.

The method of FIG. 5 is similar to the method of FIG. 3. That is, the method of FIG. 5 includes: displaying (300), by a usability engine to a plurality of usability experts (106), a usability observation video (115) of a user interacting with a computing device (112) during a usability session for studying the usability of the device (112); detecting (302), by an event listener on the computing device (112), an event (304) generated as a result of user interaction with the device (112); notifying (306), by the event listener, the usability engine of the event (304) using an event notification message (308); recording (312), by the usability engine, a description (310) of the event (304) in a session log (124); receiving (316), by the usability engine from at least one of the usability experts (106), usability observations (314) regarding the usability of the device (112) in an observation notification message (318); and recording (320), by the usability engine, the usability observations (314) in the session log (124).

In the method of FIG. 5, recording (320), by the usability engine, the usability observations (314) in the session log (124) is carried out by filtering (500) the usability observations (314) in dependence upon the particular role of each usability expert (106). The usability engine may filter (500) the usability observations (314) in dependence upon the particular role of each usability expert (106) according to the method of FIG. 5 by determining whether the observation type of the usability observations (314) provided by the usability expert (106) is authorized for storage in the session log (124) in dependence upon usability expert profiles (502). If the observation type of the usability observations (314) provided by the usability expert (106) is authorized for storage in the session log (124) in dependence upon usability expert profiles (502), then the usability engine records the usability observation (314) in the session log (124). If the observation type of the usability observations (314) provided by the usability expert (106) is not authorized for storage in the session log (124) in dependence upon usability expert profiles (502), then the usability engine does not record the usability observation (314) in the session log (124).

The usability expert profiles (502) of FIG. 5 represent data structures that associate observation types of usability observations with particular usability experts. Associating an observation type with a particular usability expert in the usability expert profile (502) indicates that the particular usability expert is authorized to provide usability observations of that observation type for storage in the session log (124). For further explanation, consider the following exemplary usability expert profile:

```
<Usability_Expert_Profile>
    <Expert ID = "Expert1">
        <Type ID = "Cognitive">
        <Type ID = "Language">
    </Expert>
    <Expert ID = "Expert2">
        <Type ID = "User Interface">
        <Type ID = "Language">
    </Expert>
    <Expert ID = "Expert3">
        <Type ID = "Application">
    </Expert>
</Usability_Expert_Profile>
```

The exemplary usability expert profile above associates observation types with three usability experts identified as 'Expert1,' 'Expert2,' and 'Expert3.' The exemplary usability expert profile above associates the observation types 'Cognitive' and 'Language' with usability expert 'Expert1,' which indicates that usability expert 'Expert1' is authorized to provide usability observations having a 'Cognitive' or 'Language' observation type for storage in the session log (124). The exemplary usability expert profile above associates the observation types 'User Interface' and 'Language' with usability expert 'Expert2,' which indicates that usability expert 'Expert2' is authorized to provide usability observations having a 'User Interface' or 'Language' observation type for storage in the session log (124). The exemplary usability expert profile above associates the observation types 'Application' with usability expert 'Expert3,' which indicates that usability expert 'Expert3' is authorized to provide usability observations having an 'Application' observation type for storage in the session log (124). Readers will note that the exemplary usability expert profile above is for explanation and not for limitation.

As usability experts study the usability of a computing device, some of the usability experts may find event descriptions of events detected on the computing device useful in assessing the device's overall usability. A usability engine may therefore provide the usability experts with the descriptions of the events detected by event listeners on the device. For further explanation, consider FIG. 6 that sets forth a flow chart illustrating a further exemplary method of creating a session log for a computing device being studied for usability by a plurality of usability experts according to embodiments of the present invention.

Figure 6:
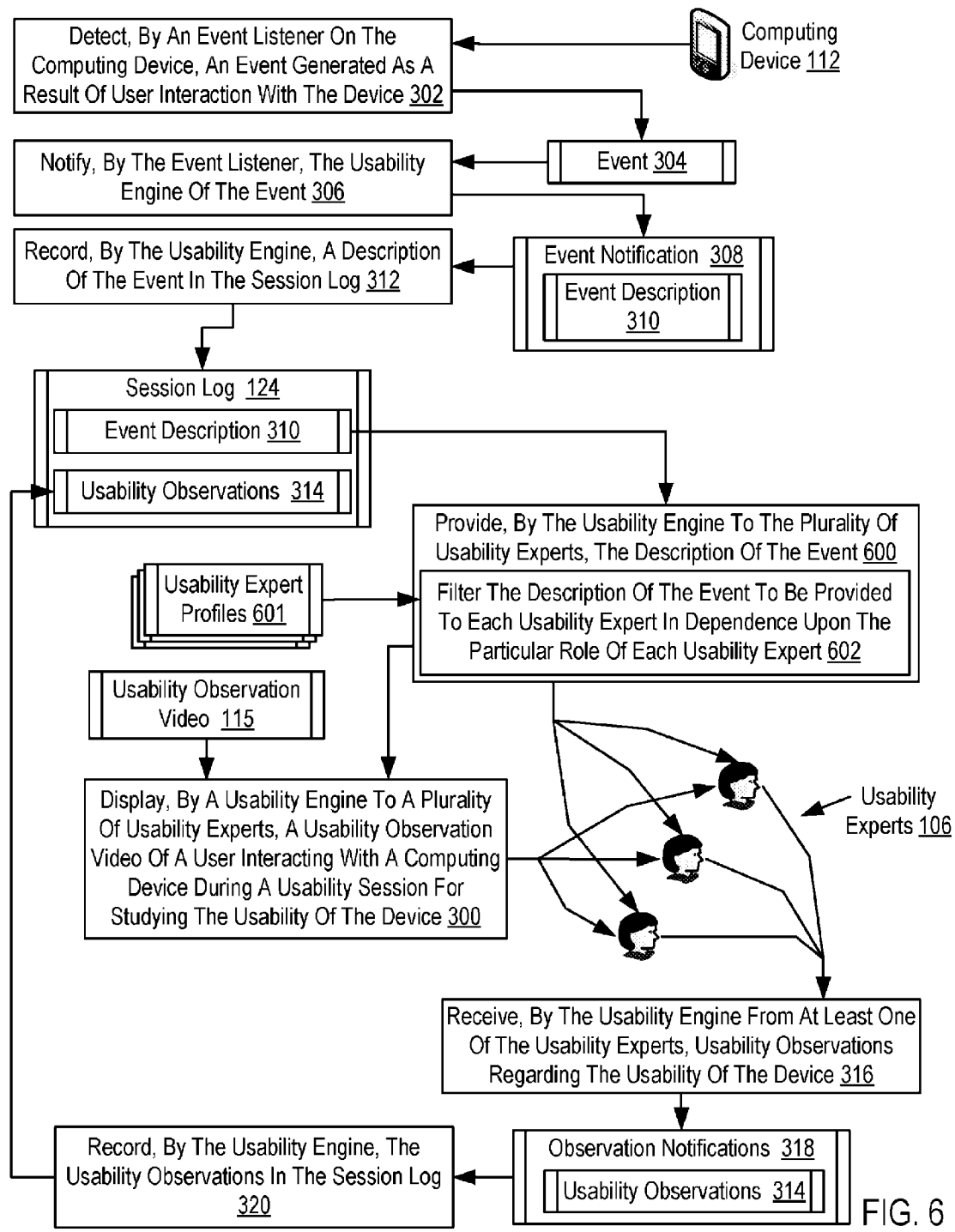
FIG. 6 sets forth a flow chart illustrating a further exemplary method of creating a session log for a computing device being studied for usability by a plurality of usability experts according to embodiments of the present invention.

The method of FIG. 6 is similar to the method of FIG. 3. That is, the method of FIG. 6 includes: detecting (302), by an event listener on a computing device (112), an event (304) generated as a result of user interaction with the device (112); notifying (306), by the event listener, a usability engine of the event (304) using an event notification message (308); recording (312), by the usability engine, a description (310) of the event (304) in a session log (124); displaying (300), by the usability engine to a plurality of usability experts (106), a usability observation video (115) of a user interacting with a computing device (112) during a usability session for studying the usability of the device (112); receiving (316), by the usability engine from at least one of the usability experts (106), usability observations (314) regarding the usability of the device (112) in an observation notification message (318); and recording (320), by the usability engine, the usability observations (314) in the session log (124).

The method of FIG. 6 also includes providing (600), by the usability engine to the plurality of usability experts (106), the description (310) of the event (304). The usability engine may provide (600) the description (310) of the event (304) to the plurality of usability experts (106) according to the method of FIG. 6 by identifying the portion of the usability observation video (115) recorded when the event (304) was detected using timecodes embedded in the usability observation video (115), and transmitting the event description (310) to the usability experts (106) using instant messaging when the portion of the usability observation video (115) recorded when the event (304) was detected is displayed to the usability experts (106). The instant messaging of the description (310) may be implemented according to any number of instant messaging protocols such as, for example, the Internet Relay Chat ('IRC') protocol, the Microsoft Notification protocol, the Extensible Messaging and Presence protocol, or any other instant messaging protocol as will occur to those of skill in the art.

As mentioned above, the event description (124) of FIG. 6 for the event (304) typically specifies the time at which the event listener on the computing device (112) detected the event (304). The usability engine may therefore identify the portion of the usability observation video (115) recorded when the event (304) was detected using timecodes embedded in the usability observation video (115) by scanning the frames of the usability observation video (115) to determine which frames have timecodes that match the time specified in the event description (124). The usability engine may identify the frames that have timecodes matching the time specified in the event description (124) as the portion of the usability observation video (115) recorded when the event (304) was detected. When matching the timecodes of the frames to the time specified in the event description (124), the usability engine may take into account any timing skews that result from two different clocks being used to embed the timecodes into the frames and the embed the time in the event description (124). To correct any such timing skews, the usability engine may calculate the skew between the clock used to embed the timecodes into the frames and the clock used to embed the time in the event description (124) and factor in the calculated timing skew when matching the timecodes of the frames to the time specified in the event description (124).

In the example of FIG. 6, each usability expert (106) has a particular role in studying the usability of the device (112). For example, one usability expert may specialize as a cognitive psychologist, another as a user interface specialist, another as an application expert, still another as a language specialist, and so on. Because each usability expert (106) has a particular role in studying the usability of the device (112), not all of the event descriptions detected on the device (112) may be relevant to all of the usability experts (106). In the method of FIG. 6, providing (600), by the usability engine to the plurality of usability experts (106), the description (310) of the event (304) includes filtering (602) the description (310) of the event (304) to be provided to each usability expert (106) in dependence upon the particular role of each usability expert (106). The usability engine may filter (602) the description (310) of the event (304) to be provided to each usability expert (106) according to the method of FIG. 6 by determining whether a particular usability expert (106) is authorized for receive particular types of event descriptions in dependence upon usability expert profiles (601). If a particular usability expert (106) is authorized for receive particular types of event descriptions in dependence upon usability expert profiles (601), then the usability engine provides the particular usability expert (106) with the description (310) of the event (304). If a particular usability expert (106) is not authorized for receive particular types of event descriptions in dependence upon usability expert profiles (601), then the usability engine does not provide the particular usability expert (106) with the description (310) of the event (304).

The usability expert profiles (601) of FIG. 6 represent data structures that associate types of event descriptions with particular usability experts. Associating a particular type of event description with particular usability experts in a usability expert profile (601) indicates that the particular usability expert is authorized to receive event descriptions of that type. For further explanation, consider the following exemplary usability expert profile:

```
<Usability_Expert_Profile>
    <Expert ID = "Expert1">
        <EventDescType ID = "SpeechListener">
    </Expert>
    <Expert ID = "Expert2">
        <EventDescType ID = "DevButtonListener">
    </Expert>
    <Expert ID = "Expert3">
        <EventDescType ID = "GUIListener">
    </Expert>
</Usability_Expert_Profile>
```

The exemplary usability expert profile above associates types of event descriptions with three usability experts identified as 'Expert1,' 'Expert2,' and 'Expert3.' The exemplary usability expert profile above associates the 'SpeechListener' event description type with usability expert 'Expert1,' which indicates that usability expert 'Expert1 ' is authorized to receive event descriptions of events generated by the event listener identified as 'SpeechListener.' The exemplary usability expert profile above associates the 'DevButtonListener' event description type with usability expert 'Expert2,' which indicates that usability expert 'Expert2' is authorized to receive event descriptions of events generated by the event listener identified as 'DevButtonListener.' The exemplary usability expert profile above associates the 'GUIListener' event description type with usability expert 'Expert3,' which indicates that usability expert 'Expert3' is authorized to receive event descriptions of events generated by the event listener identified as 'GUIListener.' Readers will note that the exemplary usability expert profile above is for explanation and not for limitation.

As mentioned above, FIG. 6 describes providing an event description to the usability experts in a separate transmission from a usability observation video. In other embodiments, however, the usability engine may provide the event descriptions to the usability experts by embedding the event descriptions in the usability observation video. For further explanation, consider FIG. 7 that sets forth a flow chart illustrating a further exemplary method of creating a session log for a computing device being studied for usability by a plurality of usability experts according to embodiments of the present invention.

Figure 7:
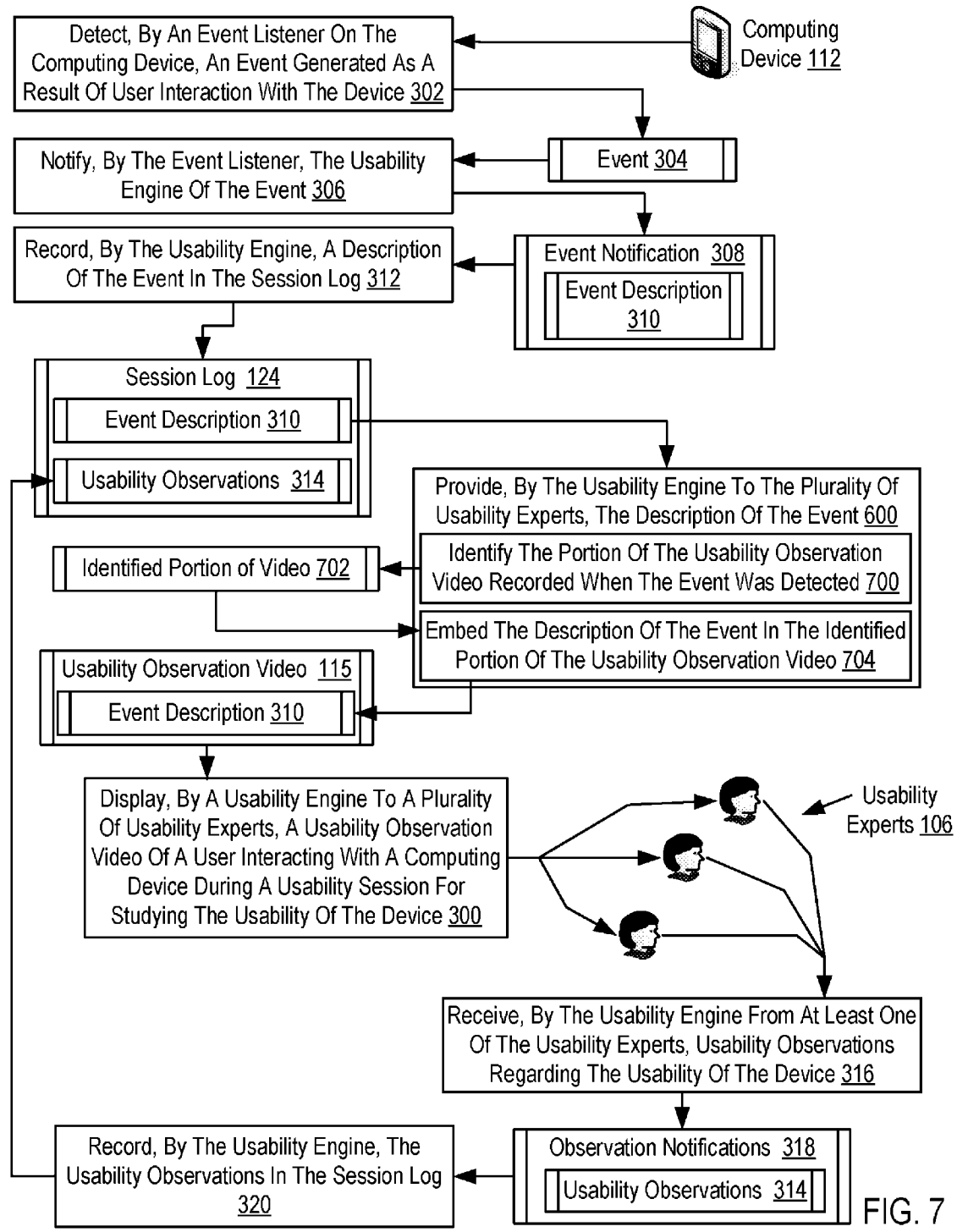
FIG. 7 sets forth a flow chart illustrating a further exemplary method of creating a session log for a computing device being studied for usability by a plurality of usability experts according to embodiments of the present invention.

The method of FIG. 7 is similar to the method of FIG. 3. That is, the method of FIG. 7 includes: detecting (302), by an event listener on a computing device (112), an event (304) generated as a result of user interaction with the device (112); notifying (306), by the event listener, a usability engine of the event (304) using an event notification message (308); recording (312), by the usability engine, a description (310) of the event (304) in a session log (124); displaying (300), by the usability engine to a plurality of usability experts (106), a usability observation video (115) of a user interacting with a computing device (112) during a usability session for studying the usability of the device (112); receiving (316), by the usability engine from at least one of the usability experts (106), usability observations (314) regarding the usability of the device (112) in an observation notification message (318); and recording (320), by the usability engine, the usability observations (314) in the session log (124).

The method of FIG. 7 also includes providing (600), by the usability engine to the plurality of usability experts (106), the description (310) of the event (304). Providing (600), by the usability engine to the plurality of usability experts (106), the description (310) of the event (304) according to the method of FIG. 7 includes identifying (700) the portion (702) of the usability observation video (115) recorded when the event (304) was detected using timecodes embedded in the usability observation video (115). In the example of FIG. 7, the event description (124) for the event (304) specifies the time at which the event listener on the computing device (112) detected the event (304). The usability engine may therefore identify (700) the portion (702) of the usability observation video (115) recorded when the event (304) was detected by scanning the frames of the usability observation video (115) to determine which frames have timecodes that match the time specified in the event description (124). The usability engine may identify the frames that have timecodes matching the time specified in the event description (124) as the portion of the usability observation video (115) recorded when the event (304) was detected. When matching the timecodes of the frames to the time specified in the event description (124), the usability engine may take into account any timing skews that result from two different clocks being used to embed the timecodes into the frames and the embed the time in the event description (124). To correct any such timing skews, the usability engine may calculate the skew between the clock used to embed the timecodes into the frames and the clock used to embed the time in the event description (124) and factor in the calculated timing skew when matching the timecodes of the frames to the time specified in the event description (124).

Providing (600), by the usability engine to the plurality of usability experts (106), the description (310) of the event (304) according to the method of FIG. 7 includes embedding (704) the description (310) of the event (304) in the identified portion (702) of the usability observation video (115). The usability engine may embed (704) the description (310) of the event (304) in the identified portion (702) of the usability observation video (115) by storing the event description (310) as metadata for the frames that make up the identified portion (702) of the usability observation video (115) using, for example, closed captioning channels such as Line 21 in the vertical blanking interval or those described in the Electronic Industries Alliance ('EIA')-708 specification, or some other metadata structures for the video as will occur to those of skill in the art. Embedding (704) the description (310) of the event (304) in the identified portion (702) of the usability observation video (115) in such a manner allows the event description (310) to be displayed to the usability experts (106) as the usability observation video (115) is displayed.

Exemplary embodiments of the present invention are described largely in the context of a fully functional computer system for creating a session log for a computing device being studied for usability by a plurality of usability experts. Readers of skill in the art will recognize, however, that the present invention also may be embodied in a computer program product disposed on computer readable media for use with any suitable data processing system. Such computer readable media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web as well as wireless transmission media such as, for example, networks implemented according to the IEEE 802.11 family of specifications. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of creating a session log for a computing device being studied for usability by a plurality of usability experts, the method comprising:

displaying, by a usability engine to a plurality of usability experts, a usability observation video of a user interacting with a computing device during a usability session for studying the usability of the device;

detecting, by an event listener on the computing device, an event generated as a result of user interaction with the device;

notifying, by the event listener, the usability engine of the event;

recording, by the usability engine, a description of the event in a session log;

receiving, by the usability engine from at least one of the usability experts, usability observations regarding the usability of the device; and recording, by the usability engine, the usability observations in the session log, wherein the session log further comprises a table of one or more records, each record representing one of a usability observation or a detected event, each record associating a time of the observation or event, a source identifier identifying a source of the observation or event, an indication of a type of the record, and information describing the observation or event.

2. The method of claim 1 wherein:
the method further comprises identifying the portion of the usability observation video displayed to the usability expert when the usability expert observed the usability observations using timecodes embedded in the usability observation video;
the method further comprises identifying, by the usability engine, the portion of the session log that corresponds to the identified portion of the usability observation video; and
recording, by the usability engine, the usability observations in the session log further comprises inserting the usability observations in the identified portion of the session log.

3. The method of claim 1 wherein:
each usability expert has a particular role in studying the usability of the device; and
recording, by the usability engine, the usability observations in the session log further comprises filtering the usability observations in dependence upon the particular role of each usability expert.

4. The method of claim 1 further comprising providing, by the usability engine to the plurality of usability experts, the description of the event.

5. The method of claim 4 wherein:
each usability expert has a particular role in studying the usability of the device; and
providing, by the usability engine to the plurality of usability experts, the description of the event further comprises filtering the description of the event to be provided to each usability expert in dependence upon the particular role of each usability expert.

6. The method of claim 4 wherein providing, by the usability engine to the plurality of usability experts, the description of the event further comprises:
identifying the portion of the usability observation video recorded when the event was detected using timecodes embedded in the usability observation video; and
embedding the description of the event in the identified portion of the usability observation video.

7. A system for creating a session log for a computing device being studied for usability by a plurality of usability experts, the system comprising:
means for displaying, to a plurality of usability experts, a usability observation video of a user interacting with a computing device during a usability session for studying the usability of the device;
means for detecting, on the computing device, an event generated as a result of user interaction with the device;
means for notifying, from the computing device, a usability engine of the event;
means for recording a description of the event in a session log;
means for receiving, from at least one of the usability experts, usability observations regarding the usability of the device; and
means for recording the usability observations in the session log, wherein the session log further comprises a table of one or more records, each record representing one of a usability observation or a detected event, each record associating a time of the observation or event, a source identifier identifying a source of the observation or event, an indication of a type of the record, and information describing the observation or event.

8. The system of claim 7 wherein:
the system further comprises means for identifying the portion of the usability observation video displayed to the usability expert when the usability expert observed the usability observations using timecodes embedded in the usability observation video;
the system further comprises means for identifying the portion of the session log that corresponds to the identified portion of the usability observation video; and
the means for recording the usability observations in the session log further comprises means for inserting the usability observations in the identified portion of the session log.

9. The system of claim 7 wherein:
each usability expert has a particular role in studying the usability of the device; and
the means for recording the usability observations in the session log further comprises means for filtering the usability observations in dependence upon the particular role of each usability expert.

10. The system of claim 7 further comprising means for providing, to the plurality of usability experts, the description of the event.

11. The system of claim 10 wherein:
each usability expert has a particular role in studying the usability of the device; and
the means for providing, by the usability engine to the plurality of usability experts, the description of the event further comprises means for filtering the description of the event to be provided to each usability expert in dependence upon the particular role of each usability expert.

12. The system of claim 10 wherein the means for providing, to the plurality of usability experts, the description of the event further comprises:
means for identifying the portion of the usability observation video recorded when the event was detected using timecodes embedded in the usability observation video; and
means for embedding the description of the event in the identified portion of the usability observation video.

13. A computer program product for creating a session log for a computing device being studied for usability by a plurality of usability experts, the computer program product disposed upon a computer readable recordable medium, the computer program product comprising computer program instructions capable of:
displaying, by a usability engine to a plurality of usability experts, a usability observation video of a user interacting with a computing device during a usability session for studying the usability of the device;
detecting, by an event listener on the computing device, an event generated as a result of user interaction with the device;
notifying, by the event listener, the usability engine of the event;
recording, by the usability engine, a description of the event in a session log;
receiving, by the usability engine from at least one of the usability experts, usability observations regarding the usability of the device; and
recording, by the usability engine, the usability observations in the session log, wherein the session log further comprises a table of one or more records, each record representing one of a usability observation or a detected event, each record associating a time of the observation or event, a source identifier identifying a source of the observation or event, an indication of a type of the record, and information describing the observation or event.

14. The computer program product of claim 13 wherein:
the computer program product further comprises computer program instructions capable of identifying the portion of the usability observation video displayed to the usability expert when the usability expert observed the usability observations using timecodes embedded in the usability observation video;
the computer program product further comprises computer program instructions capable of identifying, by the usability engine, the portion of the session log that corresponds to the identified portion of the usability observation video; and
recording, by the usability engine, the usability observations in the session log further comprises inserting the usability observations in the identified portion of the session log.

15. The computer program product of claim 13 wherein:
each usability expert has a particular role in studying the usability of the device; and
recording, by the usability engine, the usability observations in the session log further comprises filtering the usability observations in dependence upon the particular role of each usability expert.

16. The computer program product of claim 13 further comprising computer program instructions capable of providing, by the usability engine to the plurality of usability experts, the description of the event.

17. The computer program product of claim 16 wherein:
each usability expert has a particular role in studying the usability of the device; and
providing, by the usability engine to the plurality of usability experts, the description of the event further comprises filtering the description of the event to be provided to each usability expert in dependence upon the particular role of each usability expert.

18. The computer program product of claim 16 wherein providing, by the usability engine to the plurality of usability experts, the description of the event further comprises:
identifying the portion of the usability observation video recorded when the event was detected using timecodes embedded in the usability observation video; and
embedding the description of the event in the identified portion of the usability observation video.

* * * * *